United States Patent [19]

Mader

[11] Patent Number: 4,653,624
[45] Date of Patent: Mar. 31, 1987

[54] FLUID SHEAR COUPLING APPARATUS HAVING FLUID MODULATING VALVE

[75] Inventor: Gerald E. Mader, Indianapolis, Ind.

[73] Assignee: Household Manufacturing, Inc., Prospect Heights, Ill.

[21] Appl. No.: 867,152

[22] Filed: May 27, 1986

[51] Int. Cl.$^4$ ............................................. F16D 31/00
[52] U.S. Cl. ................... 192/58 B; 192/82 T
[58] Field of Search ................ 192/58 A, 58 B, 82 T

[56] References Cited

U.S. PATENT DOCUMENTS

| | | | |
|---|---|---|---|
| 3,339,689 | 9/1967 | Sutaraute | 192/58 B |
| 4,502,580 | 3/1985 | Clancey | 192/58 B |
| 4,544,053 | 10/1985 | Yamaguchi et al. | 192/58 B |
| 4,555,004 | 11/1985 | Nakamura et al. | 192/58 B |
| 4,591,037 | 5/1986 | Bopp | 192/58 B |

Primary Examiner—Carl D. Friedman
Attorney, Agent, or Firm—Woodard, Weikart, Emhardt & Naughton

[57] ABSTRACT

A fluid shear coupling apparatus includes a driving member comprising a rotor mounted to a shaft and defining several annular ridges and grooves. A driven member including a bearing housing is mounted to the shaft. A cover secured at the perimeter to the bearing housing has a disc-shaped portion defining several annular ridges and grooves positioned complementary with the ridges and grooves of the rotor. A shear fluid therebetween provides variable coupling according to the proportion of fluid in the reservoir vis a vis the working chamber defined by the complementary grooves and ridges. A temperature responsive valve cooperates with a modulation ramp encasing the valve end to provide a fluid control orifice which varies in size and radial location in response to temperature, thereby providing temperature modulation of the amount of shear fluid in the working chamber, and consequently, the degree of coupling.

9 Claims, 19 Drawing Figures

FLUID SHEAR COUPLING APPARATUS HAVING FLUID MODULATING VALVE

BACKGROUND OF THE INVENTION

1. Field of the Invention

The present invention relates to the field of fluid shear couplings of the type used as a vehicle fan drive in which a rotor is received within a driven member and coupled thereto by a viscous working fluid flowing therebetween, and in particular to such a fluid shear coupling in which the flow of working fluid is modulated by a temperature responsive valve.

2. Description of the Related Art

A variety of fluid shear couplings, also referred to as viscous couplings, have been proposed in the prior art. Many of these couplings include a rotor which is connectable with an external drive source and is received within a housing that defines a fluid shear chamber. Improvements for such couplings have been proposed along many lines including bearing structures, fluid valving, temperature controls and torque transfer.

In vehicular applications, where the fluid shear coupling is used in association with a cooling fan, it is desirable that the coupling be "engaged" only when the ambient temperature is above some predetermined limit so as to minimize power consumption by the fan when it is not needed for cooling. Accordingly, fluid shear couplings have been provided with temperature responsive valves which regulate the flow of working fluid from a reservoir to the fluid shear chamber. That is, when the temperature is low, the valve is closed and only a minimal amount of the fluid flows to the fluid shear chamber (through a bleed hole), thereby providing minimal coupling. This is the "disengaged" condition. As the temperature rises above the predetermined actuation temperature, the valve opens and fluid quickly enters the fluid shear chamber causing maximum coupling. This is the "engaged" condition.

Prior temperature responsive valves have typically involved a fluid flow aperture located near the periphery of the coupling connecting the reservoir with the fluid shear chamber, and a closure element which covers or uncovers the aperture depending upon temperature conditions. Such valves have typically been designed such that they move between an effectively closed condition and an effectively open condition in response to a relatively small temperature change centered about the design operation temperature. That is, as the ambient temperature rises and approaches the design operation temperature, the coupling goes from a disengaged condition to an engaged condition quite abruptly, and vice versa, as the ambient temperature drops. Consequently, the coupling is in effect either maximally engaged or minimally engaged at all times.

It would be desirable to provide a fluid shear coupling with a temperature responsive valve which would modulate the degree of coupling over a relatively wide range of ambient temperature. Thus, no more power than necessary for cooling would be used by the coupling as dictated by the prevailing temperature conditions. In the preferred embodiment, the present invention provides a fluid shear coupling with an improved valve which modulates the flow of working fluid therethrough in more direct proportion to temperature than prior valves, and which provides such modulation over a relatively wide temperature range.

SUMMARY OF THE INVENTION

In accordance with one aspect of the present invention, there is provided a fluid shear coupling apparatus which includes a driving member including a rotor and a shaft connected to the rotor and adapted and configured for transmitting rotational drive from an external drive source to the rotor, the rotor having a first shear surface. A driven member includes a second shear surface configured and positioned complementary to the first shear surface of the rotor and defining therewith a fluid shear chamber cooperable with a shear fluid received therein for transmitting torque between the driving member and the driven member. Bearing mount means are provided for mounting the driven member to the driving member for relative rotation between the driven member and the driving member about a common axis. A shear fluid reservoir is defined by the driven member. A first fluid input aperture communicates the fluid reservoir with the fluid shear chamber at a first location radially-inward of the first and second complementary fluid shear surfaces. Fluid return means are provided for returning shear fluid from the fluid shear chamber at a second location radially-outward of the first and second complementary fluid shear surfaces to the fluid reservoir. A movable valve member is located within the shear fluid reservoir having a first end sized and configured to engage and close the first fluid input aperture. Valve mounting means are provided for mounting the valve member to the driven member to permit movement of the valve member between a first position in which the first end of the valve member engages and closes the first fluid aperture, and a second position in which the first end of the valve member is displaced from the first fluid aperture. A U-shaped modulation ramp extends from the driven member into the shear fluid reservoir and encases the first end of the valve member, the modulation ramp having an end wall located radially-outward of the first end of the valve member and having ramped side walls on both sides of the valve member, the side walls and end wall being closely adjacent the valve member to define a variable chamber in fluid communication with the first fluid aperture. The variable chamber is bounded on three sides by the modulation ramp, above by the valve member, and below by the driven member, with the height of the side walls decreasing in the radial direction toward the axis of rotation of the driven member. The remaining open side of the variable chamber faces substantially radially-inward toward the axis of rotation of the driven member and provides a second fluid input aperture communicating the shear fluid reservoir with the variable chamber. The size and radial location of the second fluid input aperture is at least partially defined by the intersection of the first end of the valve member with the ramped side walls. Temperature responsive means are provided for variably positioning the valve member between the first position and the second position, in response to temperature. The result of the above described combination being that the proportionate distribution of shear fluid in the fluid reservoir vis-a-vis the fluid shear chamber is related to temperature, thereby providing temperature modulation of the degree of coupling in the fluid shear coupling apparatus.

In a second aspect of the present invention, the valve member has a second end located within the fluid reservoir, the second end of the valve member being encased by a U-shaped damping pocket extending from the driven member into the fluid shear reservoir, the damping pocket having walls closely adjacent the second end of the valve member to define a second variable chamber bounded on three sides by the walls of the damping pocket, above by the second end of the valve member, and below by the driven member. The remaining open side of the second chamber provides a third fluid aperture communicating the shear fluid reservoir with the second variable chamber, whereby shear fluid trapped in the second chamber damps vibration and smooths movement of the valve member as it moves between the first and second positions.

It is an object of the present invention to provide temperature proportionate modulation of the degree of coupling between the driving and driven members of a fluid shear coupling.

A further object of the present invention is the provision of a fluid shear coupling with a valve mechanism which achieves the above objective, and which also provides damping of vibration and smoothness of action of the valve.

Additional objects and advantages of the present invention will be apparent from the following descriptions.

DESCRIPTION OF THE PREFERRED EMBODIMENT

For the purposes of promoting an understanding of the present invention, reference will now be made to the embodiment illustrated in the drawings and specific language will be used to describe the same. It is nevertheless to be understood that no limitation of the scope of the invention is thereby intended, the proper scope of the invention being indicated by the claims appended below and the equivalents thereof.

Figures 1, 1A, 1B, 2, 3:
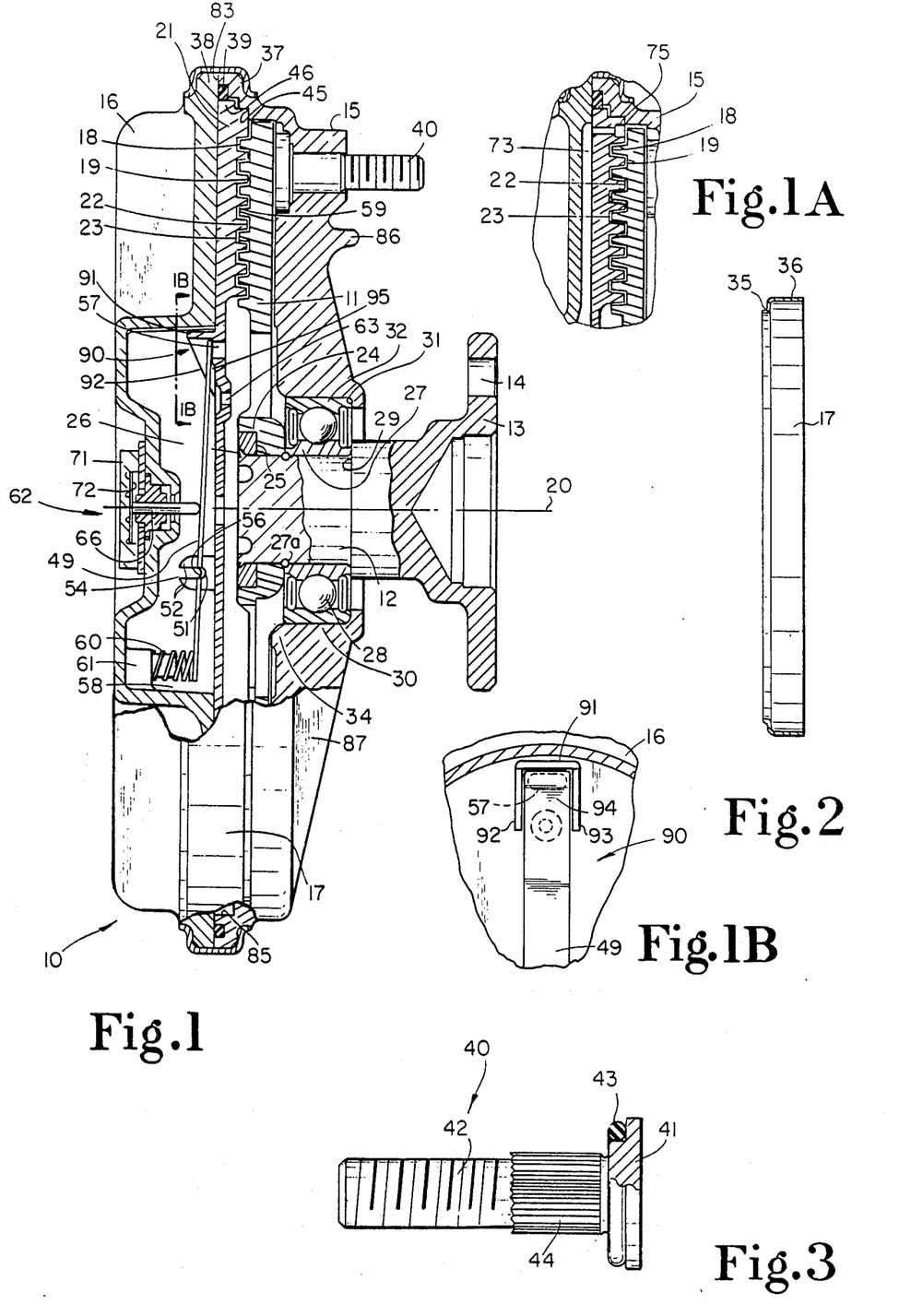
FIG. 1 is a side, partially cross-sectional view of a fluid shear coupling apparatus constructed in accordance with the present invention.
FIG. 1A is a partial cross-sectional view of the apparatus of FIG. 1, and particularly showing the fluid recirculation passageways.
FIG. 1B is a partial cross-sectional view of the apparatus of FIG. 1, taken along the plane 1B—1B, and particularly showing the valve modulation ramp.
FIG. 2 is a side, cross-sectional view of a band useful in the apparatus of FIG. 1 for joining the bearing housing and the cover.
FIG. 3 is a side view, partially in section, showing a bolt useful in the apparatus of FIG. 1.

Referring in particular to the drawings, there is shown a fluid shear coupling apparatus 10 constructed in accordance with the present invention. In FIG. 1 there is shown a coupling apparatus in assembled form, with certain of the components shown more specifically in the subsequent figures.

The preferred embodiment generally comprises a driving member connected with an external drive source, and a driven member mounted to the driving member for relative rotation about a common axis. The driven member includes a plate 21, a bearing housing 15 and a cover 16 secured together by a metal band 17. The driving member includes a disc-shaped rotor 11 secured to a shaft 12. The shaft includes a mounting portion 13 which is connectable to an external drive source, such as by the reception of bolts (not shown) through apertures 14. A typical external drive source is a vehicle engine for an embodiment in which the apparatus 10 is used as a coupling device for driving a plurality of fan blades mounted to the driven member.

The rotor 11 is shown to have several annular ridges 18 and grooves 19 facing in a first direction parallel to the central axis 20. The driven member includes a plate 21 mounted to the bearing housing 15 and cover 16. The plate 21 includes several annular ridges 22 and grooves 23 facing in a second axial direction, opposite the first direction. The ridges and grooves of the plate 21 are received adjacent respective grooves and ridges of the rotor 11. These provide spaced, opposed shear surfaces defining a fluid shear chamber therebetween and cooperable with shear fluid in the fluid shear chamber to transmit torque between the rotor and the plate. The close-spaced positioning of the complementary shaped and located ridges and grooves of the rotor and plate provides for varying degrees of coupling between the driving member and the driven member in relation to the amount of fluid received in the intervening shear chamber, as is well understood in the art.

The driven member and driving member are mounted together to have relative rotation about the central axis 20. The rotor 11 includes an outer, disc-shaped portion which defines the several annular ridges and grooves. The rotor also includes an inner hub portion 24 which is mounted to the shaft 12. Particularly, the hub portion 24 includes a hexagonal steel washer 25 received within a correspondingly shaped hexagonal recess in hub portion 24. Washer 25 includes several radially-spaced depressions which are utilized in staking the shaft to the rotor, as shown for example in FIG. 1 at 26.

The bearing housing 15 is bearingly mounted to the shaft 12. The inner race 27 of ball bearings 28 is received between the hub portion 24 of the rotor and a shoulder 29 of the shaft 12, with retaining snap ring 27a being disposed in an annular groove about shaft 12 between hub portion 24 and inner race 27. The bearing housing 15 defines a central hub portion 30 defining a shoulder 31 against which one side of the outer race 32 of the ball bearings is received.

The cover 16 is secured to the bearing housing 15, preferably by means of a magneformed band 17. As shown in FIG. 2, the band 17 has an initial configuration in which one of the shoulders 35 is already formed to conform with a corresponding surface on the perimeter of the cover 16. The main portion 36 of the band is formed at a slight angle, about 2°, from the central axis to facilitate placement of the band onto the housing and cover. The band is positioned on the cover and housing, and the magneforming process is then carried out. The forces generated by the surrounding magnetic field are sufficient to force the band 17 firmly against the outer, perimetric flanges 37 and 38 of the housing 15 and cover 16, respectively, to provide a secure clamping together of these components. The band is readily and quickly applied by this process, with the actual magneforming occurring in a fraction of a second.

As shown, the bearing housing and cover include relatively small and simply configured flanges 37 and 38, respectively, about which the band 17 is received. The bearing housing further defines an annular recess in the flange 37 in which an O-ring 39 is received to provide a seal between the bearing housing and the cover.

As previously indicated, a typical application for the fluid shear coupling apparatus of the present invention is for providing a fan drive in respect to a vehicle engine. In this regard, the bearing housing 15 is provided with several apertures through which bolts, such as 40, are received. As shown particularly in FIG. 3, the bolt 40 preferably comprises a head 41 and a ribbed-necked shank 42. The head includes a perimetric shoulder which receives a silicone seal ring 43. When the bolt is received through the aperture in the bearing housing 15, the seal ring 43 is pressed against the surface of the housing and thereby seals the aperture to prevent fluid loss.

The shank 42 preferably includes a ribbed neck portion 44 adjacent the head of the bolt and including several axially directed ribs. These ribs are sized to be received in the aperture of the bearing housing and to grip tightly against the surface of the aperture to prevent rotation of the bolt when a nut is applied to the bolt externally of the housing. A simple and reliable technique for mounting a fan blade onto the bearing housing is thereby provided. The bolt 40 is inserted through the aperture in the bearing housing prior to assembly of the coupling apparatus. The ribbed portion 44 holds the bolt within the aperture so that the seal ring effectively seals the aperture, even prior to attachment of the fan blades. The ribbed portion also grips within the aperture to permit the fan blade and fastening nut to be applied on the exposed threaded shank after the coupling has been assembled.

Secured to the cover 16 is a plate 21 which defines several annular ridges and grooves of the driven member. Specific details for the plate 21 and the cover 16 are provided in FIGS. 4A-4D and 5A-5C, respectively.

As shown in FIG. 1, the bearing housing 15 includes an annular recess 45 in which is received the outer, perimetric edges of the plate 21. The plate is thereby clamped between the bearing housing 15 and the cover 16 when those components are secured together by means of the band 17. As shown particularly in FIG. 4B, the plate 21 is also provided with projections 46 which are received within corresponding recesses in the bearing housing (FIG. 1) to operate as a key to prevent relative rotation of the plate with respect to the cover and bearing housing.

To facilitate assembly and particularly to provide proper alignment of the plate with respect to the cover, the plate is provided with three projections 47 which are received within three corresponding recesses 48 in the cover 16. The fit of the projections 47 in the recesses 48 is sufficient to provide a preliminary attachment between the plate and the cover such that the plate and cover may be assembled together prior to fitting with the bearing housing 15. As will be apparent from the following description, the projections 47 are used to align the plate with respect to the cover to assure a proper orientation of the valve and other components.

Figure 7:
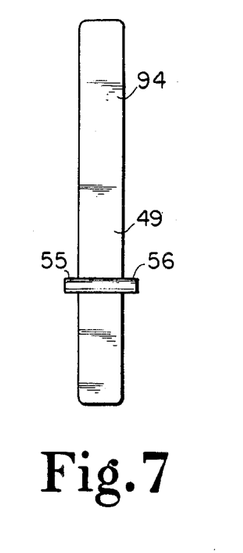
FIG. 7 is an elevational view of the valve of the apparatus of FIG. 1.
Figure 8:
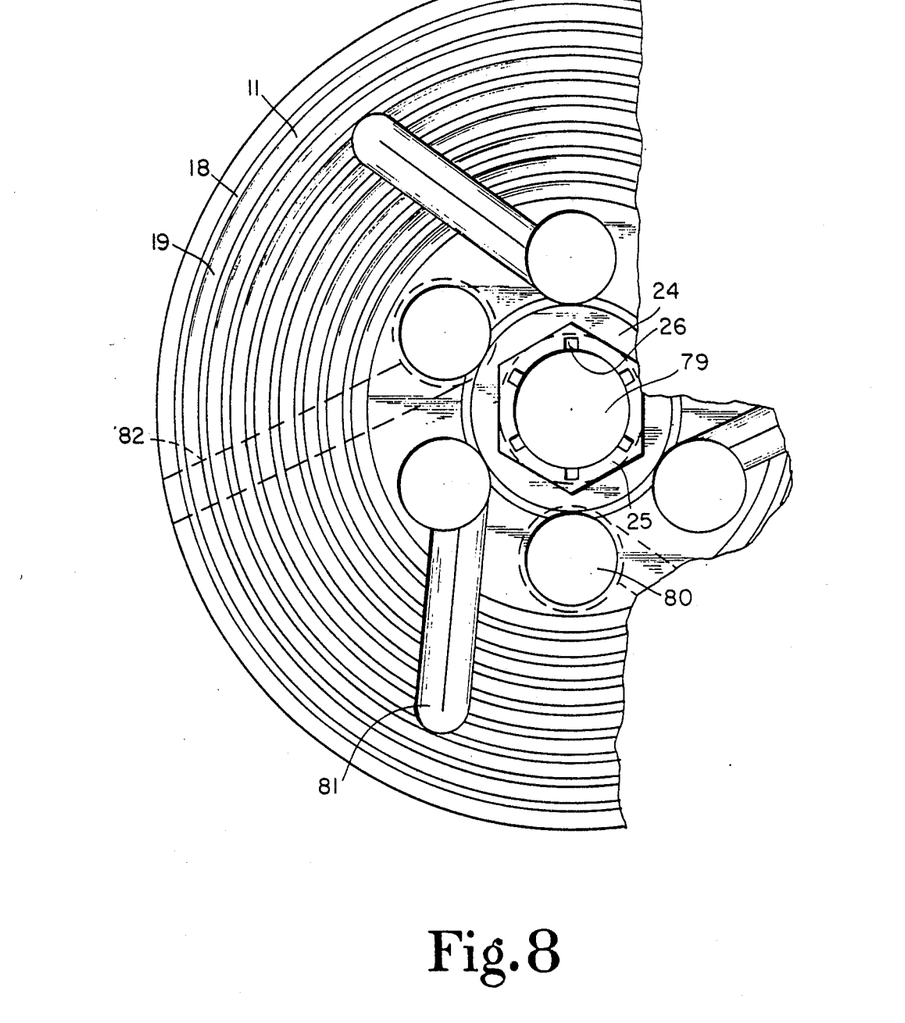
FIG. 8 is a front, elevational view of the grooved side of the rotor shown in FIG. 1.

The plate 21 and cover 16 are provided with cooperating projections to carry a valve 49. The plate 21 includes a pair of spaced apart arcuate pivot support surfaces 50 and 51, and also lateral pivot retaining projections 52 and 53. Valve 49 is made of flat sheet metal and has integral pivot pins 55 and 56 extending from the sides thereof (see FIG. 7). Pivot pins 55 and 56 are formed by deforming valve 49 so that extensions 55 and 56 are provided with an arcuate bottom surface for engaging pivot support surfaces 50 and 51.

The valve 49 is positioned for opening and closing an aperture 57 to control the flow of fluid between a fluid reservoir 58 and the working or shear chamber 59 defined by the space between the closely positioned ridges and grooves of the plate 21 and rotor 11. One end of a coil spring 60 is inserted on boss 61, and the other end engages the valve 49. Spring 60 biases the valve to an open position in which the aperture 57 is open and fluid flow is provided between the reservoir and the working chamber 59. A bleed hole 63 extends through the plate 21 to permit a slight bleeding of fluid from the reservoir into the working chamber in conventional fashion.

Figure 6A:
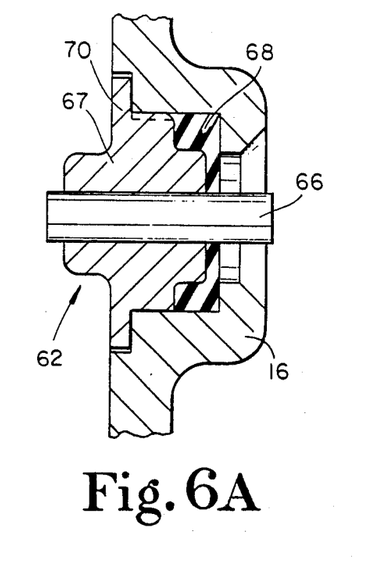
FIG. 6A is a cross-sectional view of a portion of the cover of the apparatus of FIG. 1, particularly showing the valve control pin sealing means.
Figure 6B:
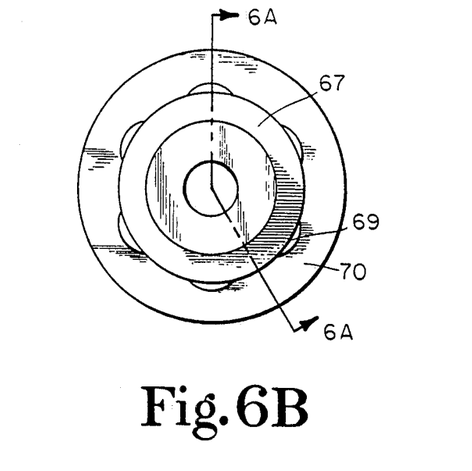
FIG. 6B is an end, elevational view of the seal insert shown in FIG. 6A.

Control of the valve 49 is provided by a control mechanism 62. The cover 16 defines a central recess in which is received a seal insert 67 and a seal 68, as shown in FIG. 6A. The seal insert 67 retains the seal 68 in position, and includes several ribs 69 (FIG. 6B) which act to hold the insert in place within the cavity defined by the cover 16. The insert 67 also includes a flange portion 70 which is received within a complementary shaped recess of the cover 16. A bracket assembly 71 (FIG. 1) retains the flange portion 70 of the seal insert in place. The seal insert 67 and seal 68 define aligned apertures in which a piston pin 66 is slidably received. One end of piston pin 66 engages valve 49 intermediate pivot support 50 and aperture 57. The bracket assembly 71 maintains a heat strip 72 in position against the other end of the pin 66.

The heat strip 72 and piston pin 66 cooperate to control the movement of the valve 49 between open and closed positions. The pin 66 has one end engaging valve 49, and the other end abutting the heat strip 72. Displacement of the heat strip 72, such as with changes in ambient temperature, will therefore result in a movement of the pin 66 and a corresponding movement of the valve 49.

In accordance with the present invention, fluid shear coupling apparatus 10 is provided with modulation ramp 90 which cooperates with valve 49 to modulate the flow of working fluid through orifice 57 as valve 49 opens. Modulation ramp 90 includes an end wall 91 and ramped side walls 92 and 93 arranged in a generally U-shaped configuration which encases end portion 94 of valve 49, and orifice 57. Walls 91–93 are oriented substantially perpendicularly to plate 21 with their interior surfaces closely adjacent the edges of end portion 94 to define a chamber 95 closed on three sides by walls 91, 92 and 93, above by end portion 94 and below by plate 21. Chamber 95 has a fluid entrance on the remaining open side of modulation ramp 90 which faces radially inward, toward axis of rotation 20. A fluid exit from chamber 95 is provided by orifice 57. Ramped side walls 92 and 93 decrease in height above plate 21 in the radially inward direction.

The modulating operation may be described briefly, as follows. In the disengaged mode, apparatus 10 will have most of the silicone coupling fluid located within reservoir 58, provided the ambient temperature is below the calibration temperature predetermined by the bimetallic heat strip 72 on the front of housing 16. In the disengaged state, valve 49 is held shut by heat strip 72 via piston pin 66 located therebetween. As the ambient temperature increases, the heat strip 72 bows outward in a linear fashion allowing valve spring 60 to force valve 49 off its seat, opening the main fluid circulation path from reservoir 58 through orifice 57 to working chamber 59. Modulation ramp 90 encasing end portion 94 provides modulating action by relying on the position of valve 49 and its intersection with ramped walls 92 and 93 to define a variable orifice fluid entrance to chamber 95. This variable orifice, the cross-sectional area of which is proportional to the displacement of valve 49 from its seat, regulates the flow of fluid to fixed orifice 57.

Figures 4A, 4B, 4D, 4E:
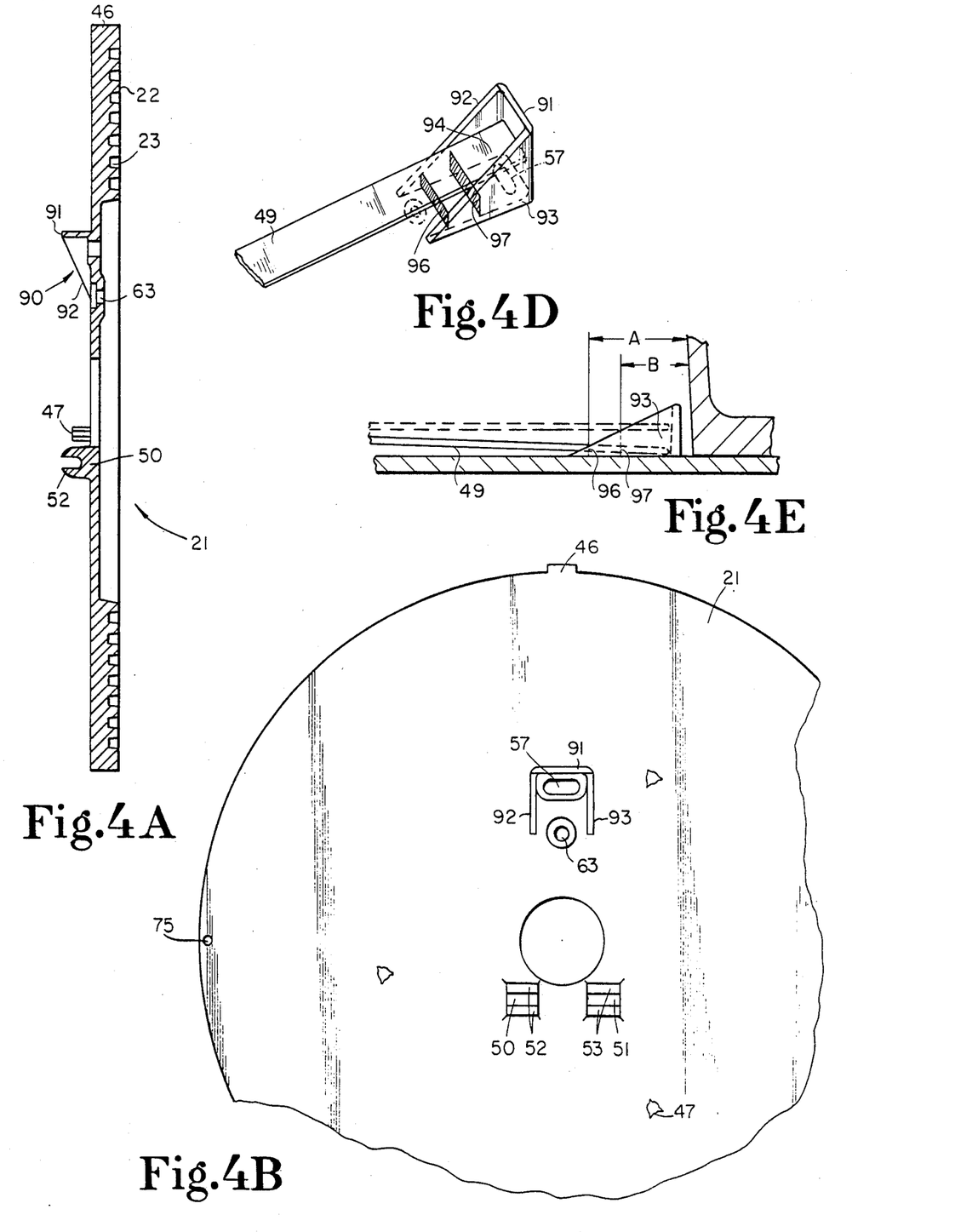
FIG. 4A is a side, cross-sectional view of a plate insert used in the apparatus of FIG. 1.
FIG. 4B is an elevational view of the cover side of the plate insert shown in FIG. 4A.
FIG. 4D is a perspective view of the valve and modulation ramp of the apparatus of FIG. 1, showing in particular the change in location and size of the fluid entrance orifice with change in position of the valve.
FIG. 4E is a side elevational view of the valve and modulation ramp of the apparatus of FIG. 1, showing in particular the change in location and size of the fluid entrance orifice with change in position of the valve.
Figure 4C:
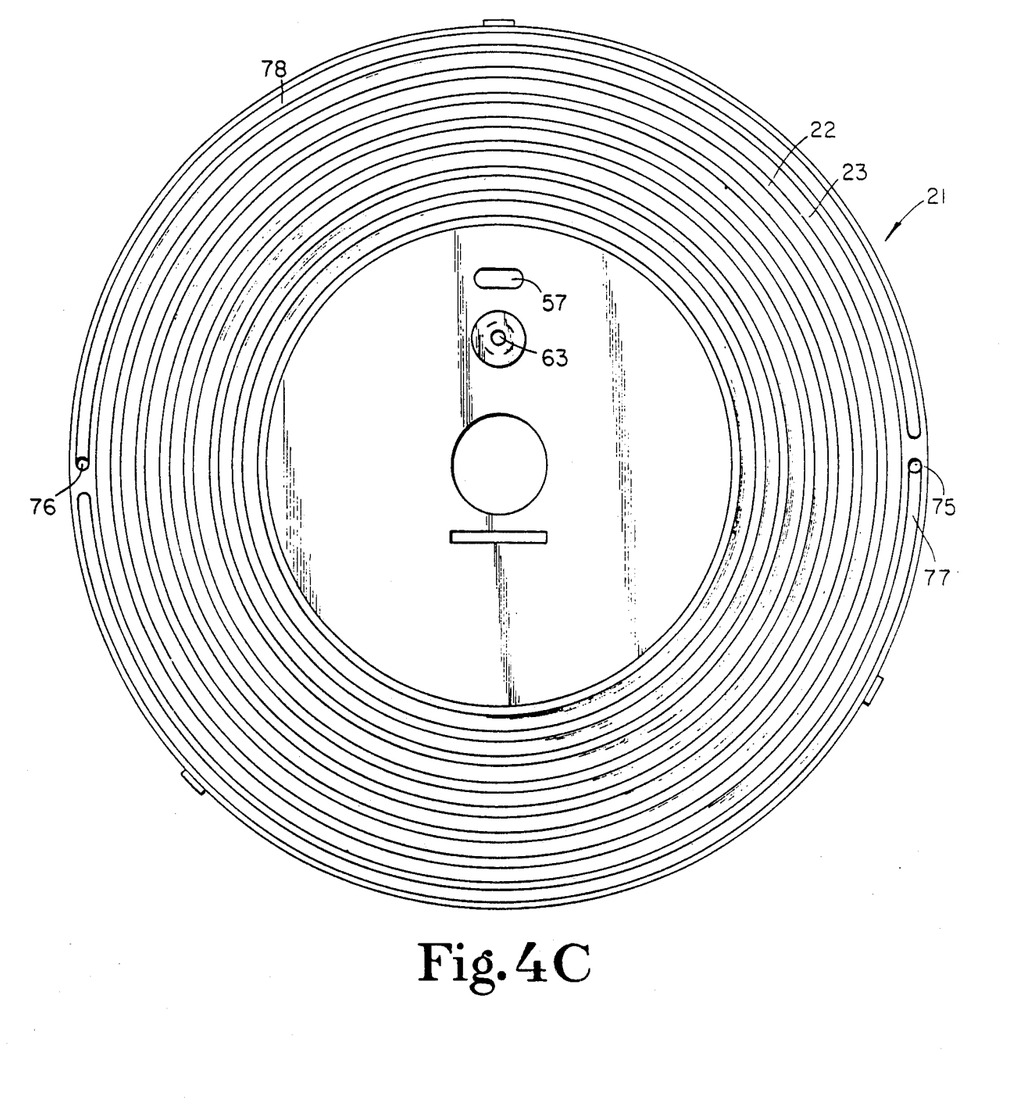
FIG. 4C is an elevational view of the grooved side of the plate insert of FIG. 4A.

In addition, the position of valve 49, and in particular the point of its intersection with ramped walls 92 and 93, controls the level of the fluid in reservoir 58. In explanation, the fluid in reservoir 58 takes on a toroidal, or "doughnut" shape, by conforming to the round peripheral shape of reservoir 58 as a result of the centrifugal force generated by the spinning of cover 16. Consequently, as fluid empties from reservoir 58, the inner surface of the fluid toroid will tend to move radially outwardly, concurrent with a decrease in the "depth" of the fluid at the periphery of the reservoir. As valve 49 opens, the entrance orifice to chamber 95 not only increases in cross-sectional area, but shifts in location radially outwardly. This principle is best shown in FIGS. 4D and 4E, where the area indicated by reference numeral 96 represents the effective cross-sectional area and location of the fluid entrance orifice at a particular displacement of valve 49. At a greater displacement of valve 49, the fluid entrance orifice is of greater area and located radially outward, as shown by the area indicated by reference numeral 97. In the first position of valve 49, the inner surface of the fluid toroid is located such that the fluid has depth A, whereas in the second position the fluid surface is located such that the fluid has depth B. Hence, the inner surface of the fluid toroid follows the valve line of action up the ramped walls 92 and 93. This assures that for a given valve position, the level of fluid within the reservoir, and consequently, the volume of fluid available for coupling action in working chamber 59, remains relatively constant, although the fluid is constantly circulating from the reservoir radially outwardly through the working chamber and back again to the reservoir. The amount of coupling is therefore proportional to the linear displacement of valve 49 in response to temperature change. The total amount of movement of piston pin 66 to achieve full coupling is increased over prior art designs, thereby modulating the degree of coupling over a greater range of temperature change.

The modulation ramp described herein provides advantages in addition to modulation of engagement of the driving and driven members. The need for separate on-off and modulating valves is eliminated, thereby effecting a cost reduction. A further advantage of modulation ramp 90 is the creation of a damping effect on closure of valve 49. Working fluid contained within chamber 95 forms a hydraulic cushion which damps vibration of valve 49 as it closes. Furthermore, fluid pressure above end portion 94 (generated by centrifugal force) resists the opening of valve 49, thereby smoothing and damping the opening of the valve. The danger of destruction of weighted modulating valves due to resonant excitation of the valve by crank vibration is eliminated, because no weight is required on the valve for modulation. The modulation of fluid flow with respect to valve position is more nearly linear than in weighted valve modulators.

Figure 9:
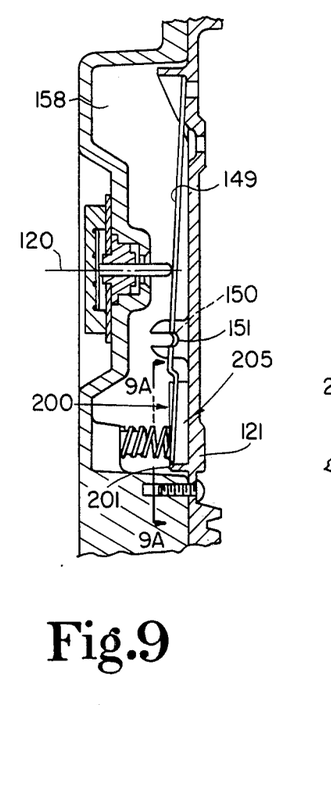
FIG. 9 is a side, cross-sectional view of an alternative embodiment of the present invention, showing in particular a modification of the valve mechanism of the apparatus of FIG. 1 to incorporate a damping pocket.
Figure 9A:
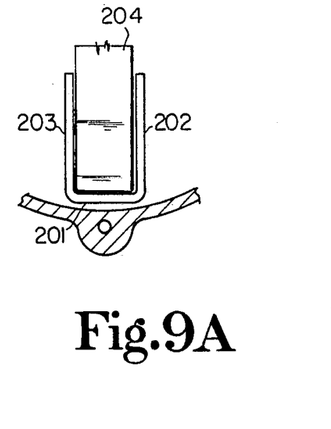
FIG. 9A is a partial cross-sectional view of the valve of FIG. 9, taken along the plane 9A—9A, and particularly showing the valve and its cooperating damping pocket.

Referring in particular to FIGS. 9 and 9A, there is illustrated another embodiment in accordance with a further aspect of the present invention. In this second embodiment, plate 121 is provided with a pocket 200 encasing the tail end of valve 194 and cooperating therewith to further damp vibration of valve 149 as it opens and closes. Pocket 200 includes an end wall 201 and side walls 202 and 203 arranged in a generally U-shaped configuration which encases end portion 204 of valve 149. Walls 201, 202 and 203 are oriented substantially perpendicularly to plate 121 with their interior surfaces closely adjacent the edges of tail end portion 204 to define a chamber 205 closed on three sides by walls 201, 202 and 203, above by end portion 204 and below by plate 121. Chamber 205 has a fluid opening on the remaining open side of pocket 200 which faces radially inward, toward axis of rotation 120. End wall 201 and side walls 202 and 203 are of substantially constant and equal height above plate 121. Tail end portion 204 of valve 149 is shaped so as to be parallel to plate 121 when valve 149 is in the open position.

The damping effect of pocket 200 can be briefly described as follows. Working fluid forced outward toward the periphery of reservoir 158 by centrifugal force enters chamber 205 and is trapped beneath tail end portion 204 when valve 149 is in the closed position. As valve 149 opens, it pivots on pivot support surfaces 150 and 151, and tail end portion 204 is forced down into pocket 200 toward plate 121. The working fluid trapped in chamber 205 is squeezed out as tail end portion 204 lowers, thereby providing a hydraulic cushion to damp vibration upon opening of valve 149. Furthermore, fluid pressure above end portion 204 (generated by centrifugal force) resists the closing of valve 149, thereby smoothing and damping the closing of the valve.

It should be understood that a damping pocket such as pocket 200 shown in FIGS. 9 and 9A can be advantageously employed by itself to improve the damping action of a valve such as valve 149, in addition to its use in combination with the modulation ramp disclosed herein. When used alone, the damping pocket can be located at either end of the valve, or at both ends, if desired.

As will become more apparent in the following description, the provision of the seal insert 67 and seal 68 significantly simplifies the fabrication of the cover 16, which providing aligned apertures within which the pin 66 is received. The seal 68 is made of a suitable material to provide a sufficient seal about its periphery in contact with the recess in the cover 16, and also to provide a sliding seal with the pin 66. The seal insert 67 is received within the cover, as previously described, and is formed of a suitably rigid material to compress the seal within the recess to assure a firm, sealed fit. The insert also maintains the positioning of the seal 68 to provide a suitable contact with the pin 66.

As a result of the presence of these two components, a seal is accomplished with the cover 16 and the pin 66 without a requirement for special treatment of the associated surfaces of the cover 16, other than by the original forming procedures such as casting of the cover with the indicated recesses. In contrast, other devices have typically included a machining of the cover to receive a seal member. It is a feature of the present embodiment that a fluid shear coupling is provided that requires a minimal amount of processing of such components as the rotor and cover. In other devices, it is typical to first cast the cover, then drill and ream a hole for reception of the valve pin, and then to trepan a groove on the inside in which a sealing boot was glued. Casting of the groove has been difficult because such grooves have typically been relatively deep and narrow. The embodiment described herein avoids these several steps and minimizes the fabrication of the cover. Also, the pin is received in apertures in the seal insert and seal which both provide lower coefficients of friction than the reamed hole provided in the past, and these components are not subject to corrosion. Also, no glue is required by the present construction.

As is apparent from the description, the plate 21 is an integral and substantially closed component. By this it is meant that the plate does not have any substantial openings, particularly at the center, which are required to be closed by a separate closure element. In contrast, the typical coupling utilizes a cover which has the shear surfaces, such as the annular ridges and grooves, as an integral portion. Such units have included a central aperture radially inward of the shear surfaces, which aperture is then closed by a separate cover plate provided for defining a fluid reservoir in the cover and for supporting the valve structures.

In contrast, the present embodiment includes a plate 21 which cooperates with the cover to define the fluid reservoir while also having the shear surfaces, preferably the annular ridges and grooves, as an integral portion. The present design therefore permits the valve pin supports 50-53, the fluid aperture 57, and the bleed hole 63 to all be readily formed as integral components of the plate 21 at the time of its fabrication. There is no need for providing an additional cover plate which in other designs is typically staked to the cover for attachment purposes.

Figure 5A:
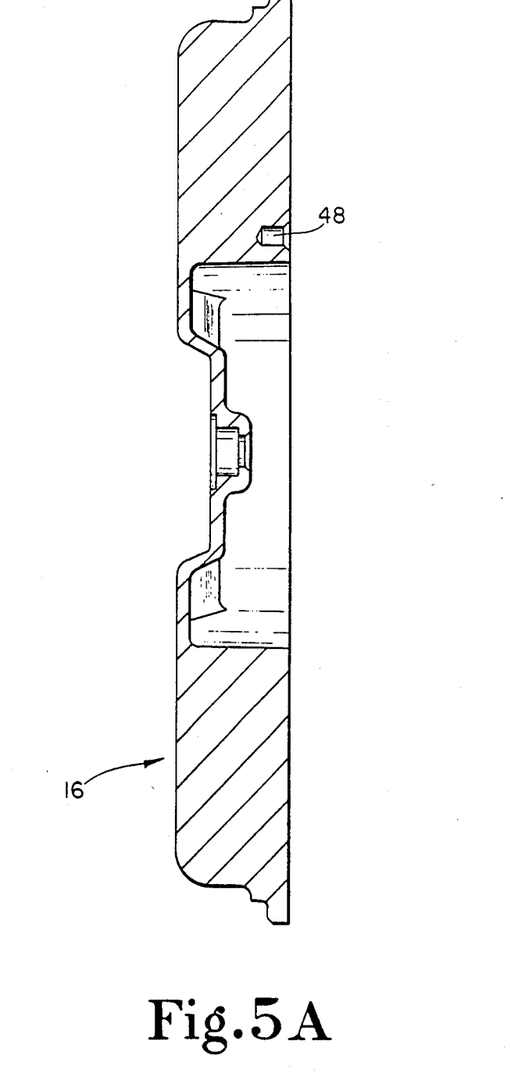
FIG. 5A is a side, cross-sectional view of the cover of the apparatus of FIG. 1.
Figure 5B:
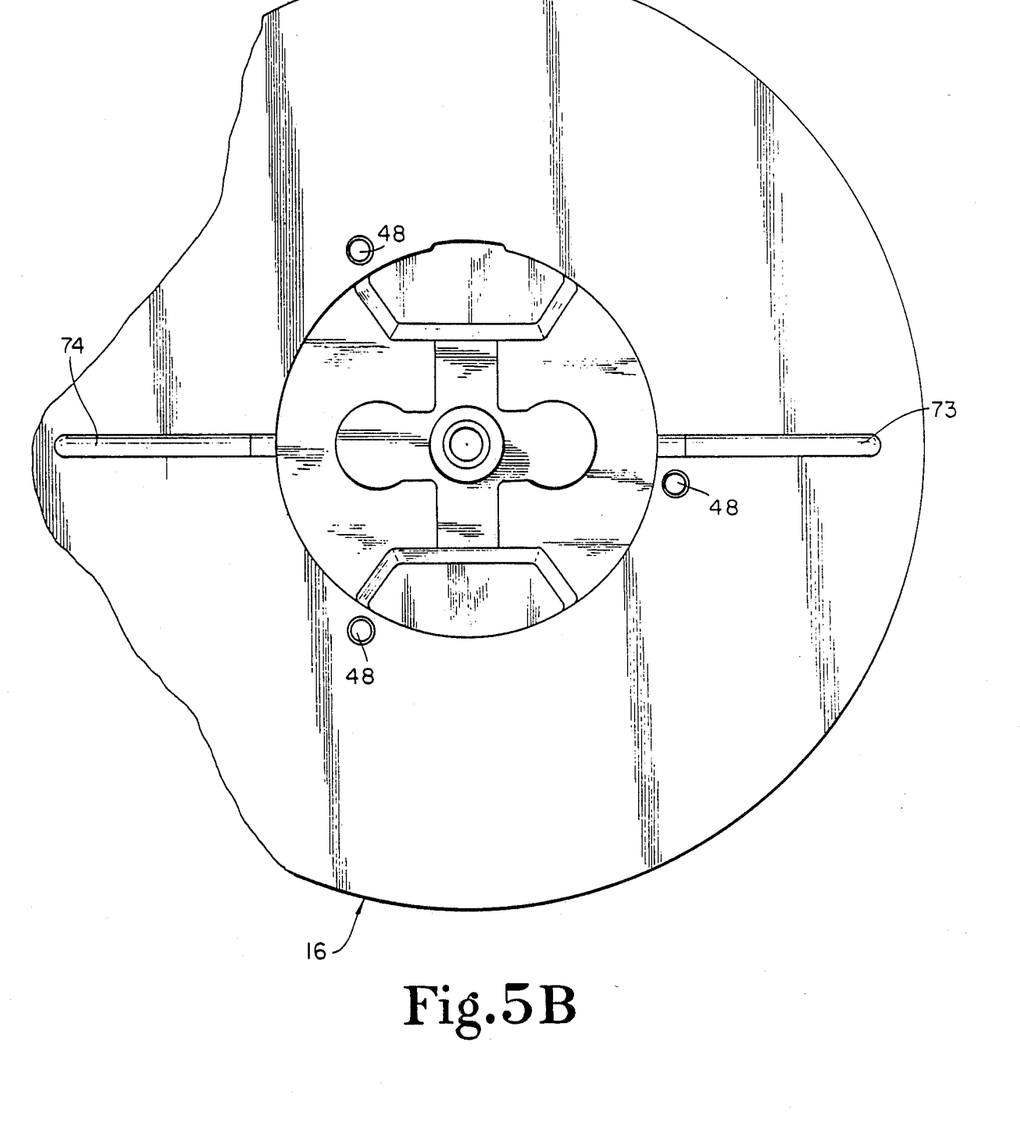
FIG. 5B is an inside, elevational view of the cover shown in FIG. 5A.
Figure 5C:
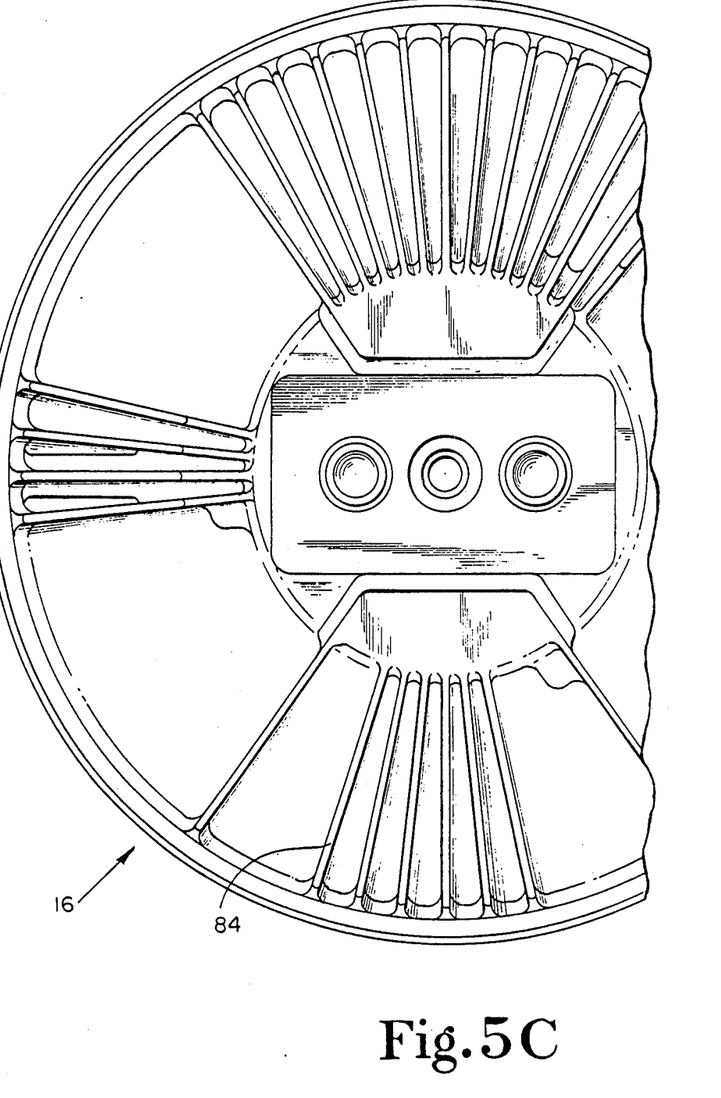
FIG. 5C is an outside, elevational view of the cover shown in FIG. 5A.

The provision of the plate 21 also simplifies the formation of the recirculation passageways through which fluid moves from the shear chamber back to the fluid reservoir. With other designs, it has been necessary to drill and ball the recirculation holes. However, the present construction utilizing the separate cover 16 and plate 21 permits the recirculation passageways to be formed at the time of initial fabrication for these two components. As shown in FIG. 5B, the cover 16 is formed with a pair of radially-extending grooves 73 and 74. The plate 21 includes a pair of corresponding holes 75 and 76 extending through the thickness of the plate and communicating with the outermost annular grooves 77 and 78. The holes 75 and 76 are located to align and communicate with the grooves 73 and 74 upon assembly of the plate 21 to the cover 16. The channels 73 and 74 are thereby positioned to define passageways between the plate 21 and cover 16 which communicate with the respective holes 75 and 76 and with the central fluid reservoir 58. The holes are positioned at the end of the corresponding grooves 77 and 78 such that fluid within the grooves will be forced through the holes 75 and 76 and radially inward along channels 73 and 74 to the fluid reservoir.

While the preferred embodiment of the invention has been illustrated and described in some detail in the drawings and foregoing description, it is to be understood that this description is made only by way of example to set forth the best mode contemplated of carrying out the invention and not as a limitation to the scope of the invention which is pointed out in the claims below.

What is claimed is:

1. A fluid shear coupling apparatus which comprises:
   a driving member including a rotor and a shaft connected to said rotor and adapted and configured for transmitting rotational drive from an external drive source to said rotor, said rotor having a first shear surface;
   a driven member including a second shear surface configured and positioned complementary to the first shear surface of the rotor and defining therewith a fluid shear chamber cooperable with a shear fluid received therein for transmitting torque between said driving member and said driven member;
   bearing mount means for mounting said driven member to said driving member for relative rotation between said driven member and said driving member about a common axis;
   a shear fluid reservoir defined by said driven member;
   a first fluid input aperture communicating the fluid reservoir with the fluid shear chamber at a first location radially-inward of the first and second complementary fluid shear surfaces;
   fluid return means for returning shear fluid from the fluid shear chamber at a second location radially-outward of the first and second complementary fluid shear surfaces to the fluid reservoir;
   a movable valve member located within said shear fluid reservoir having a first end sized and configured to engage and close the first fluid input aperture;
   valve mounting means for mounting said valve member to said driven member to permit movement of said valve member between a first position in which the first end of the valve member engages and closes the first fluid aperture, and a second position in which the first end of the valve member is displaced from the first fluid aperture;
   a U-shaped modulation ramp extending from the driven member into the shear fluid reservoir and encasing the first end of said valve member, said modulation ramp having an end wall located radially-outward of the first end of the valve member and having ramped side walls on both sides of the valve member, the side walls and end wall being closely adjacent the valve member to define a variable chamber in fluid communication with the first fluid aperture and bounded on three sides by the modulation ramp, above by the valve member, and below by the driven member, the height of the side walls decreasing in the radial direction toward the axis of rotation of the driven member, the remaining open side of the variable chamber facing substantially radially-inward toward the axis of rotation of the driven member and providing a second fluid input aperture communicating the shear fluid reservoir with the variable chamber, the size and radial location of the second fluid input aperture being at least partially defined by the intersection of the first end of the valve member with the ramped side walls; and temperature responsive means for variably positioning said valve member between said first position and said second position in response to temperature;

whereby the proportionate distribution of shear fluid in the fluid reservoir vis a vis the fluid shear chamber is related to temperature, thereby providing temperature modulation of the degree of coupling in the fluid shear coupling apparatus.

2. The fluid shear coupling apparatus of claim 1, in which said movable valve member is an elongated member oriented substantially diametrically with respect to the driven member and pivotable substantially in a plane defined by the longitudinal axis of the valve member and the axis of rotation of the driven member.

3. The fluid shear coupling apparatus of claim 1, in which said valve member has a second end located within said fluid reservoir, the second end of the valve member being encased by a U-shaped damping pocket extending from the driven member into the fluid shear reservoir, the damping pocket having walls closely adjacent the second end of the valve member to define a second variable chamber bounded on three sides by the walls of the damping pocket, above by the second end of the valve member, and below by the driven member, the remaining open side of the second chamber providing a third fluid aperture communicating the shear fluid reservoir with the second variable chamber, whereby shear fluid trapped in the second chamber damps vibration and smooths movement of the valve member as it moves between the first and second positions.

4. The fluid shear coupling apparatus of claim 3, in which said movable valve member is an elongated member oriented substantially diametrically with respect to the driven member and pivotable substantially in a plane defined by the longitudinal axis of the valve member and the axis of rotation of the driven member, said first and second ends being located at diametrically opposite ends of the valve member with the valve member being pivotable about a point intermediate the first and second ends.

5. A fluid shear coupling apparatus which comprises:
a driving member including a rotor and a shaft connected to said rotor and adapted and configured for transmitting rotational drive from an external drive source to said rotor, said rotor having a first shear surface;

a driven member including a second shear surface configured and positioned complementary to the first shear surface of the rotor and defining therewith a fluid shear chamber cooperable with a shear fluid received therein for transmitting torque between said driving member and said driven member;

bearing mount means for mounting said driven member to said driving member for relative rotation between said driven member and said driving member about a common axis;

a shear fluid reservoir defined by said driven member;

a first fluid input aperture communicating the fluid reservoir with the fluid shear chamber at a first location radially-inward of the first and second complementary fluid shear surfaces;

fluid return means for returning shear fluid from the fluid shear chamber at a second location radially-outward of the first and second complementary fluid shear surfaces to the fluid reservoir;

a movable valve member located within said shear fluid reservoir having a first end sized and configured to engage and close the first fluid input aperture, said valve member having a second end located within said fluid reservoir, at least one of the first and second ends of the valve member being encased by a U-shaped damping pocket extending from the driven member into the fluid shear reservoir, the damping pocket having walls closely adjacent the end of the valve member to define a variable chamber bounded on three sides by the walls of the damping pocket, above by the end of the valve member, and below by the driven member, the remaining open side of the variable chamber providing a fluid aperture communicating the shear fluid reservoir with the variable chamber;

valve mounting means for mounting said valve member to said driven member to permit movement of said valve member between a first position in which the first end of the valve member engages and closes the first fluid aperture, and a second position in which the first end of the valve member is displaced from the first fluid aperture; and temperature responsive means for variably positioning said valve member between said first position and said second position in response to temperature;

whereby shear fluid trapped in the variable chamber damps vibration and smooths movement of the valve member as it moves between the first and second positions.

6. The fluid shear coupling apparatus of claim 5, in which the second end of the valve member is encased by a U-shaped damping pocket.

7. The fluid shear coupling apparatus of claim 6, in which the first end of the valve member is encased by a U-shaped damping pocket.

8. The fluid shear coupling apparatus of claim 5, in which the first end of the valve member is encased by a U-shaped damping pocket.

9. The fluid shear coupling apparatus of claim 5, in which said movable valve member is an elongated member oriented substantially diametrically with respect to the driven member and pivotable substantially in a plane defined by the longitudinal axis of the valve member and the axis of rotation of the driven member.

* * * * *